United States Patent [19]
Ishii

[11] 4,342,201
[45] Aug. 3, 1982

[54] ENERGY RECOVERY APPARATUS FOR A GAS COMPRESSOR PLANT

[75] Inventor: Hiroshi Ishii, Akashi, Japan

[73] Assignee: Kawasaki Jukogyo Kabushiki Kaisha, Kobe, Japan

[21] Appl. No.: 233,821

[22] Filed: Feb. 12, 1980

[30] Foreign Application Priority Data

Feb. 19, 1980 [JP] Japan .................. 55/19968

[51] Int. Cl.$^3$ .............................................. F25B 27/02
[52] U.S. Cl. ..................................... 62/238.4; 62/501
[58] Field of Search ....................... 62/238.4, 580, 501, 62/87, 116

[56] References Cited

U.S. PATENT DOCUMENTS

| | | | |
|---|---|---|---|
| 2,721,728 | 10/1955 | Higgins ........................... | 62/238.4 |
| 2,952,138 | 9/1960 | Russell et al. ..................... | 62/238.4 |
| 3,259,176 | 7/1966 | Rice et al. ......................... | 62/238.4 |
| 3,266,261 | 8/1966 | Anderson ......................... | 62/501 X |
| 3,277,658 | 10/1966 | Leonard, Jr. ....................... | 62/87 |
| 3,385,348 | 5/1968 | Embury ............................. | 62/501 X |
| 3,394,555 | 7/1968 | LaFleur ............................. | 62/238.4 |
| 4,144,723 | 3/1979 | Morse et al. ....................... | 62/501 X |
| 4,214,170 | 7/1980 | Leonard ............................ | 62/87 X |
| 4,271,679 | 6/1981 | Schafer ............................ | 62/238.4 |

Primary Examiner—Lloyd L. King
Attorney, Agent, or Firm—Merriam, Marshall & Bicknell

[57] ABSTRACT

This disclosure relates to apparatus for increasing the efficiency of a gas compressor plant by converting a portion of heat that is normally wasted into mechanical energy. The gas, when compressed, is heated due to the compression. The compressed and heated gas is passed through a cooler or heat exchanger where a portion of the heat of compression is transferred to a coolant. The heated coolant in turn is passed to a mechanical device where the heat energy is converted to useful mechanical energy.

9 Claims, 17 Drawing Figures

PRIOR ART

No. of Intermediate Coolers

ENERGY RECOVERY APPARATUS FOR A GAS COMPRESSOR PLANT

This invention relates to gas compressor plants of the type that is provided with an intercooler, or an aftercooler, or with both, generally for use in chemical plants.

As is well known, there are many manufacturing and processing plants, such as chemical plants, that require a facility for supplying gas under pressure, and FIGS. 1 to 3 show examples of such prior art gas compressor facilities. In FIG. 1, a drive such as on engine 1 is coupled to drive a turbine gas compressor 2. The gas intake of the compressor 2 receives gas from a suitable source (not shown) and the high pressure gas outlet is connected to a gas cooler or heat exchanger 3. As shown in FIG. 1, the gas cooler 3 is provided at the outlet of gas compressor 2 in many chemical plants so as to reduce the temperature of the compressed gas. The temperature of gas is increased because of the heat of compression, and while the pressure is required, the increased temperature is usually undesired. For this reason, the compressed gas is usually cooled before use, and, for this purpose the cooler 3 is provided. A coolant, such as relatively cool water, is moved through a coolant path in order to remove some of the heat from the compressed gas.

FIG. 2 shows a two-stage compressor wherein the compressor is separated into a low-pressure compressor stage 2-1 and a high-pressure compressor state 2-2 in order to reduce the driving force required of the compressor. The outlet of the low-pressure stage 2-1 is generally equipped with a so-called intercooler 3 which cools the compressed gas and passes the cooled gas to the high-pressure stage 2-2, thereby reducing the driving force at the high-pressure compressor stage 2-2.

Some multiple stage compressors (FIG. 3) are equipped with both an intercooler 3-1 and with an aftercooler 3-2. In such gas compressors provided with an intercooler or an after-cooler, a high temperature of the compressed gas is unnecessary in the chemical plants utilizing a high-pressure compressor stage and an intercooler. Therefore, the compressed air is cooled as described above.

In such conventional facilities, such coolers usually use sea-water or industrial water, or they may use air where water is insufficient to cool the compressed gas. In other words, the thermal energy of the compressed gas has been discharged outside the system as hot waste water or waste gas in order that the temperature of the compressed gas may be the desired value for the plant utilizing the compressed gas. From the recent viewpoint of saving energy, it is hardly necessary to say that it is further highly desirable to reduce the amount of power required to drive such a compressor. In the conventional compressor equipment shown in FIGS. 1 through 3, every possible effort has been made in the past to improve the internal efficiency of the compressor. In such compressors provided with an intercooler as shown in FIG. 2 or FIG. 3, much effort has been made not only to improve the internal efficiency of the compressor, but also to decrease the temperature of the compressed gas at the outlet of the intercooler, or at the inlet of high-pressure compressor stage, in order to decrease the driving force required. As a practical matter, however, it is impossible to decrease the gas temperature at the outlet of the intercooler below that of the coolant, such as cooling water. Besides, the internal efficiency of the compressor cannot be improved any higher. Accordingly, in prior systems the driving force required for the compressor cannot be effectively decreased below a given limit. As explained above, this invention has been made to overcome the limitation in the reduction of the driving force required for the compressor.

The quantity of heat exhausted through the intercooler or the after-cooler has been large as will be described later. However, a large quantity of cooling water or cooling air has been used in an attempt to decrease the temperature of the compressed gas. Therefore, the temperature of the cooling water or cooling air supplied through the cooler is relatively low. For instance, if the temperature of the cooling water to be supplied to the cooler is 25° C., the temperature of the cooling water released from the cooler is approximately 35° C. at most. As shown, there is not a large difference between the temperature of the cooling water or cooling air at the outlet of intercooler or after-cooler of the conventional compressors, and that of the ambient air.

In the conventional compressors equipped with intercooler or after-cooler, it can be concluded that it has been difficult to collect such waste heat having a minimum temperature difference, and the heat was discharged outside the system and lost from the standpoint of heat balance.

The purpose of this invention is to improve this situation. That is to say, this invention may be realized by incorporating a closed refrigerant circuit in which a refrigerant is circulated without discharging the refrigerant to the outside of the system, and by providing the refrigerant with cycles of phase change such as evaporation, expansion and condensation.

The purpose of this invention is to transfer the heat quantity contained in the compressed gas to the refrigerant, and to change the refrigerant phase cyclically in the closed circuit, or to collect the heat by means of the refrigerant for use as a driving force in the process. In some embodiments, a turbine operated by the expansion of the refrigerant may be incorporated in the closed refrigerant circuit to retrieve energy or power through the refrigerant. A condenser may be also installed in the closed refrigerant circuit, which liquefies the refrigerant so as to further increase the work output of the turbine, or power retrieved.

The heat energy contained in the compressed gas can be easily transferred according to the following:
  a. The refrigerant supplied from the condenser is condensed, and the temperature of the refrigerant is satisfactorily decreased.
  b. The heat exchanger (or cooler as viewed from the aspect of the compressed gas) transferring the heat of the compressed gas to the refrigerant, is supplied with the refrigerant received from the condenser.
  c. The refrigerant is evaporated in the heat exchanger. As a matter of fact, the refrigerant must produce a condenser temperature higher than the temperature of the cooling water at the pressure of the refrigerant within the condenser, and also the refrigerant must produce an evaporating temperature lower than the temperature of the said compressed gas at the pressure of refrigerant within the said heat exchanger.

The evaporating temperature and the condensing temperature of the equivalent refrigerants can be changed respectively by adjusting the pressure within the condenser, or the pressure within the heat exchanger, for refrigerant. It is more effective to minimize the pressure within the condenser for the refrigerant and to maximize the pressure within the heat exchanger, so as to better transfer the heat quantity of the compressed gas. Therefore, a pump is provided to return the refrigerant from the condenser to the heat exchanger. As clearly stated above, it is possible to increase not only the temperature, but also the pressure of the refrigerant within the heat exchanger adjacent the compressor. Thus, it is shown that the power can be easily collected or retrieved by expanding the refrigerant. Consequently, it is possible to easily collect the heat energy contained in the compressed gas.

If the power obtained through this method is applied as a part of the power to drive the compressor, it becomes possible to greatly decrease the capacity of the main driving unit 1 (FIG. 1) for the compressor 2. As explained above, the purpose of this invention is to effectively collect some of the heat energy of the heated compressed gas, which has been wasted and further to effectively utilize the heat energy as mechanical power. This invention also helps to decrease the quantity of heat being exhausted outside of the system, thereby improving environmental conditions.

The recovered heat energy may be used to power a turbine, and the addition of the mechanical output of the turbine to the main drive for the compressor helps not only to reduce the required capacity of the main drive, but also helps to stabilize the operation for the drive of the compressor due to the fact that the output of turbine varies with the load of compressor.

The invention may be better understood with reference to the figures of the accompanying drawings, wherein.

Figure 12A:
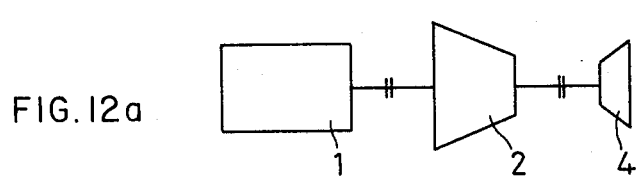
Figure 12B:
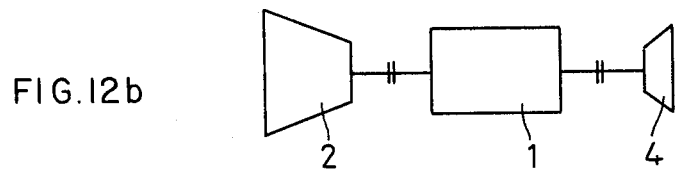
Figure 12C:
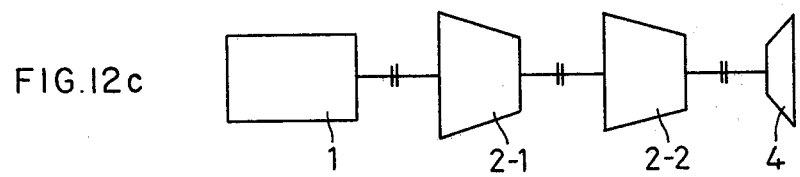
Figure 12D:
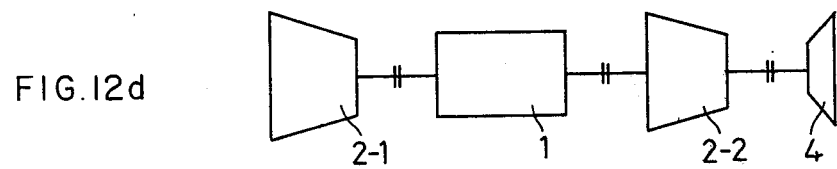
Figure 13:
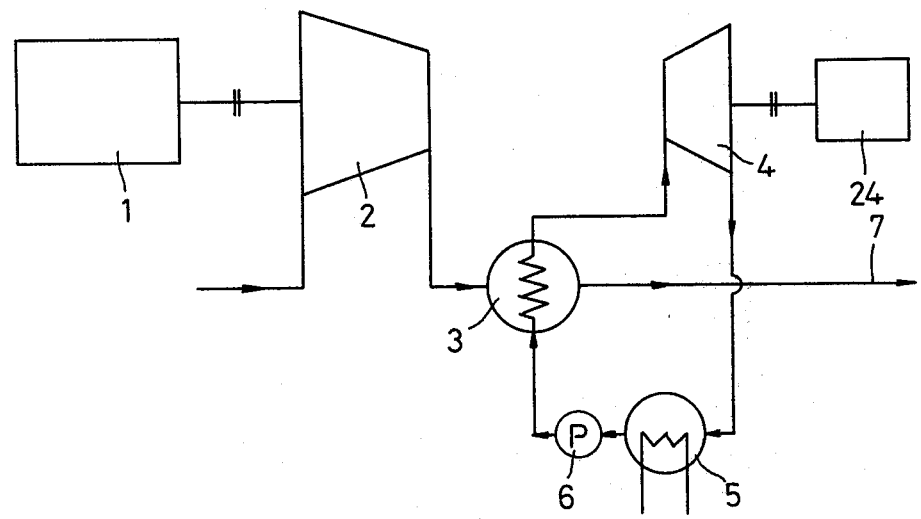
Figure 14:
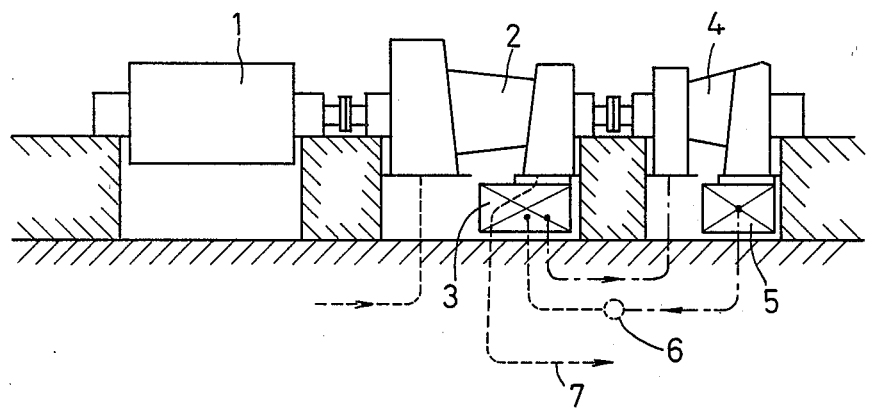
Figure 15:
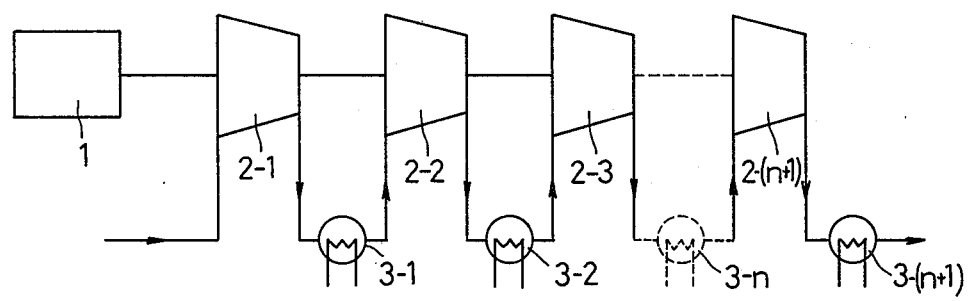
Figure 16:
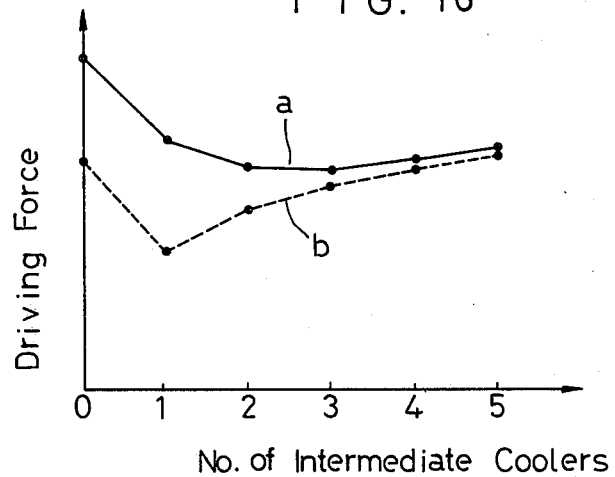
Figure 17:
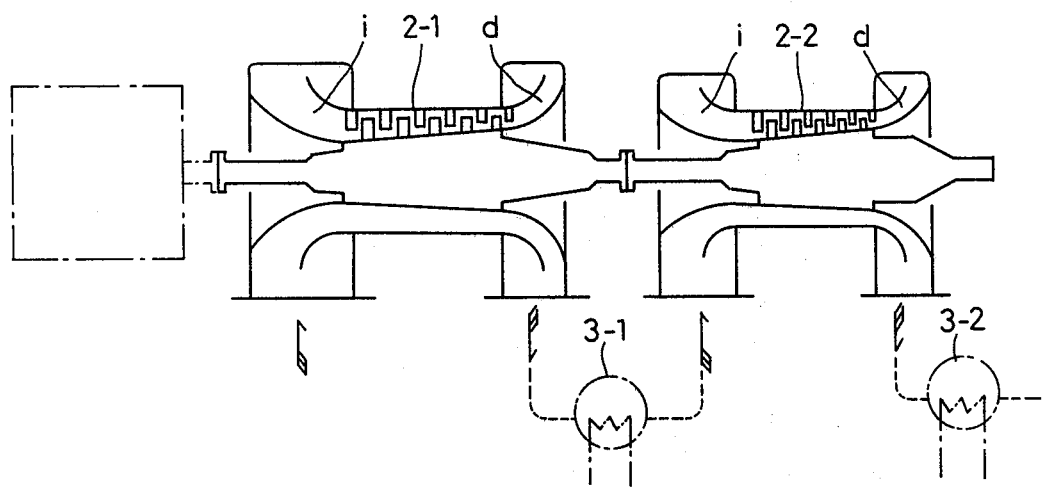

FIG. 12 (a), (b), (c) and (d) show arrangements of major rotary machines according to specific examples of this invention;

FIG. 13, which is different from FIGS. 4 through 12, exemplifies an embodiment in which the mechanical output of a turbine according to this invention is supplied to drive a driven unit;

FIG. 14 is a simplified drawing of major parts showing a structural machine layout of a specific example according to this invention;

FIG. 15 is a schematic diagram of a multiple stage compressor group having (n) number of intercoolers;

FIG. 16 shows graphs of calculated results of an example, expressing the driving unit power as a function of the number of intercoolers installed; and FIG. 17 shows a sectional drawing of an example of an axial flow type compressor including a low-pressure compressor stage and a high-pressure compressor stage.

Figure 4:
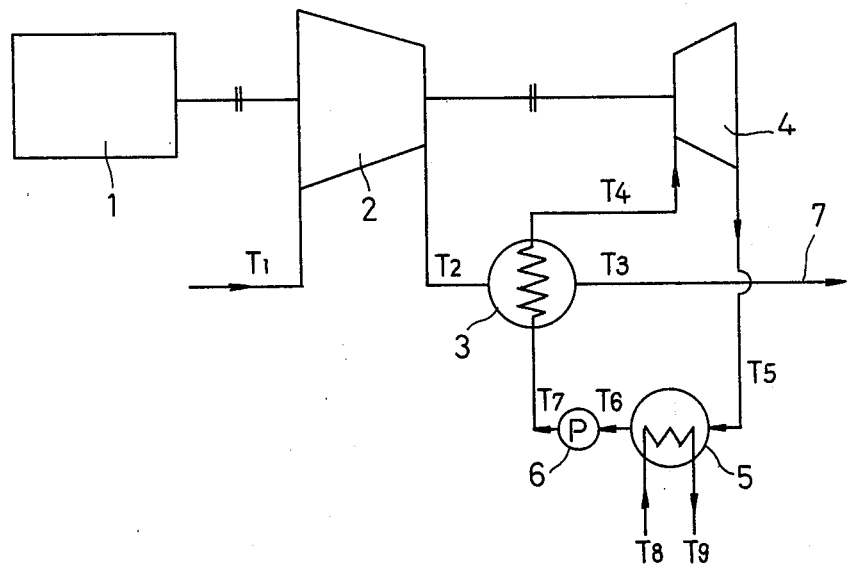
FIGS. 4 through 11 show schematic diagrams of specific examples of the present invention.

FIG. 4 shows a specific example of this invention. In FIG. 4, T1, T2 and T3 represent the temperatures of the compressed gas at the respective points, while T4, T5, T6, and T7 represent the temperatures of a circulating refrigerant at the respective points. A heat exchanger 3 transfers part of the heat of the gas compressed by the compressor 2, to a refrigerant that flows in a closed circuit that includes the exchanger 3. The refrigerant receives heat from the compressed gas without being mixed with the compressed gas, and the transferred heat evaporates the refrigerant to a high-temperature gas which enters a turbine 4. The refrigerant-gas expands in the turbine and drives it, and it then flows to a condenser 5 which liquefies the refrigerant by cooling it. This condenser 5 is cooled by, for example, cooling water supplied from outside the system (inlet temperature of water—T8, outlet temperature of water—T9). The liquefied refrigerant is pumped by a pump 6 nd then returned to the heat exchanger 3. In this manner, the refrigerant circulates through the heat exchanger, the turbine and the condenser, and thereby produces mechanical energy at the output of the turbine 4.

The output shaft of the turbine 4 is mechanically coupled to the shaft of the main drive 1 for the compressor 2 by, in this example, the shaft of the compressor 2. The gas compressed by the compressor 2 is passed through the heat exchanger 3, cooled to the temperature of T3, and then supplied through a delivery pipe 7 to the plant (not shown) that will utilize it. To simplify the description, the plant that receives the compressed gas is omitted from FIG. 4.

In the FIG. 4 system, the heat balance may be described in detail as follows:

The power (Lc) required for the compressor 2 to compress the gas may be expressed in thermal units as follows:

$$Lc/\text{unit weight flow rate of compressed gas} = C_p(T2-T1)$$

where $C_p$ is the specific heat constant at constant pressure of the gas to be compressed.

On the other hand, the heat quantity (Q) exchanged in the heat exchanger 3 is given as follows:

Heat quantity (Q) for unit flow rate of compressed gas:

$$Q = C_p(T2-T3)$$

Figure 1:
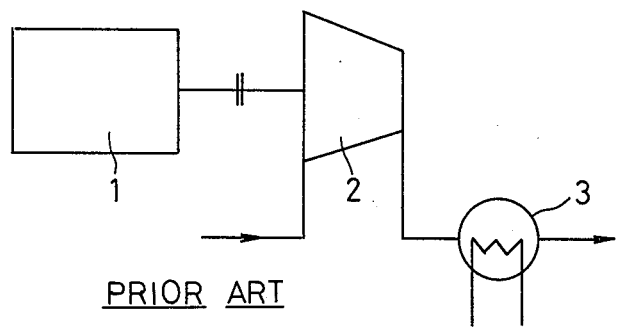
FIG. 1, FIG. 2 and FIG. 3 show schematic diagrams of conventional types of compressor systems.

In the usual case, the temperature (T3) required for a plant being supplied with the compressed gas is equal to T1 (the inlet temperature of the gas being compressed by compressor 2). However, if T3 is equal to T1, Lc is equal to Q. This means that the temperature of the compressed gas does not attain the temperature (T3) which is required by the plant unless the heat quantity equal to the power driving the compressor 2 is extracted from the compressed gas. Even if T3 is not equal to T1, the same theory applies. In the conventional compressors shown in FIGS. 1 through 3, the heat quantity corresponds to the amount of heat disposed wastefully as waste heat. The heat quantity Q which is almost equal to the power from the main drive 1, nevertheless helps to increase the temperature of refrigerant in the heat exchanger from T7 to T4. In this instance, the refrigerant changes its phase or aspect from a liquid at temperature (T7) to gas at temperature (T4).

In other words, the refrigerant can easily be evaporated in the heat exchanger 3, thus easily permitting an exchange of heat. The refrigerant gasified by the heat exchanger 3 is supplied to the turbine to provide the expansion work LT as previously described. LT is the mechanical output of the turbine 4, and helps to collect the heat quantity of the refrigerant effectively. The said refrigerant is not only cooled from the temperature (T5) to (T6), but it is also liquefied in the condenser 5. The liquefied refrigerant at temperature T6 is returned to the heat exchanger 3 by the pump 6. If the heat quantity required to cool the refrigerant from T5 to T6 is Qc, and the power required to drive the pump 6 is Lp, then:

$$Q = LT + Qc - Lp$$

where (LT−Lp) is the mechanical power collected effectively in the specific example shown in FIG. 4. Therefore, it is possible to choose the proper refrigerant, and further to determine the temperature and the pressure at each point in the system as far as (LT−Lp) is increased. Although this depends upon the cooling water temperature T8, it is advisable to choose a freon gas or an ammonia gas as the refrigerant, depending on the temperature of T8 of the cooling water. Also, the above equation can be rearranged as follows: Qc=Q−(LT−Lp), which shows that the heat quantity (Qc) to be discharged or wasted outside of the system is decreased with an increase in the power (LT−Lp) collected effectively. The decreased (Qc) to be discharged as waste water is also satisfactory from the viewpoint of environmental conditions. At the same time, the decreased (Qc) requires less cooling water. In this sense, this invention contributes greatly to the construction of the equipment at such places where the cooling water is not plentiful. As described, FIG. 4 shows a heat exchanger which directly transfers the heat of the compressed gas to that of circulating refrigerant, and the heat transfer is performed here without mixing the compressed gas with the refrigerant.

Figure 5:
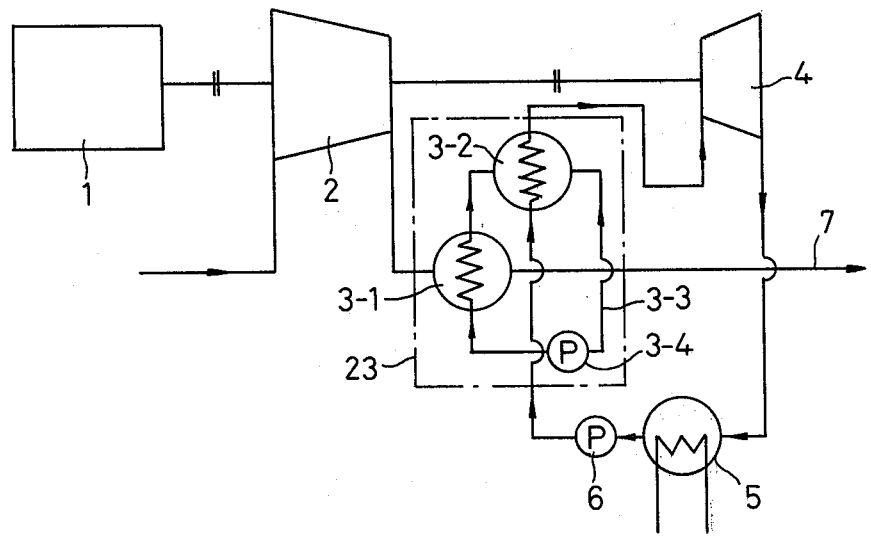

FIG. 5 shows another specific example of this invention applied to a single stage compressor system as in FIG. 4. A first heat exchanger 3-1 through which the heated compressed gas flows, is so constructed that it transfers the heat of compression to a first refrigerant, and further transfers a quantity of the heat from the first refrigerant to a second refrigerant by means of a second heat exchanger 3-2. The first refrigerant is circulated in a closed circuit, indicated by the numeral 3-3, which includes the two heat exchangers 3-1 and 3-2. If the circuit 3-3, including the exchangers 3-1 and 3-2, is regarded as one heat exchanger, it corresponds to the heat exchanger 3 shown in FIG. 4. Also the second refrigerant corresponds to the refrigerant flowing through the turbine 4 shown in FIG. 4. A pump 3-4 circulates the first refrigerant through the closed circuit including the exchangers 3-1 and 3-2, and a second pump 6 circulates the second refrigerant through the exchanger 3-2, a turbine 4 and a condenser 5. In the examples shown in FIG. 4, the turbine 4 is mechanically coupled to drive the turbine compressor 2 and thereby assists the main drive 1.

In the specific example in FIG. 5, since the refrigerant used is separated into the first refrigerant and the second refrigerant, each refrigerant can be optimally chosen, and therefore, the power collected or retrieved in the turbine 4 can be more greater than that in FIG. 4.

Figure 6:
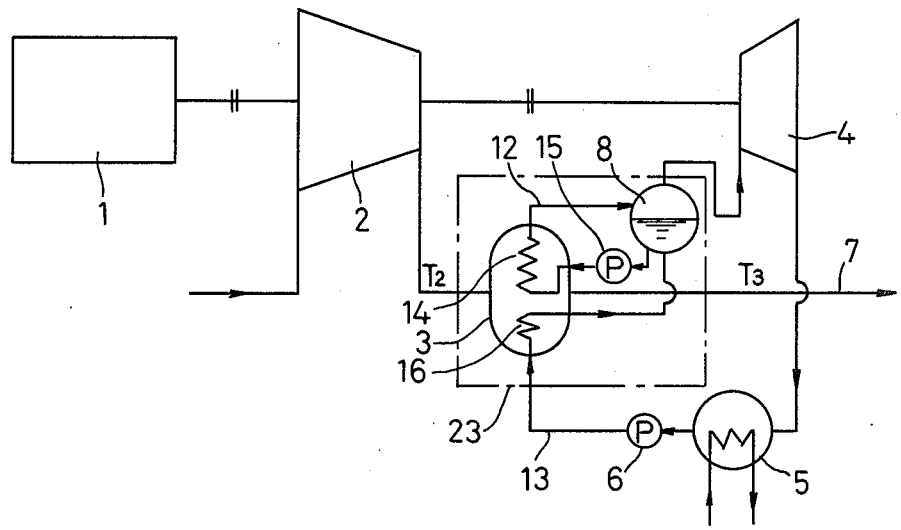
Figure 7:
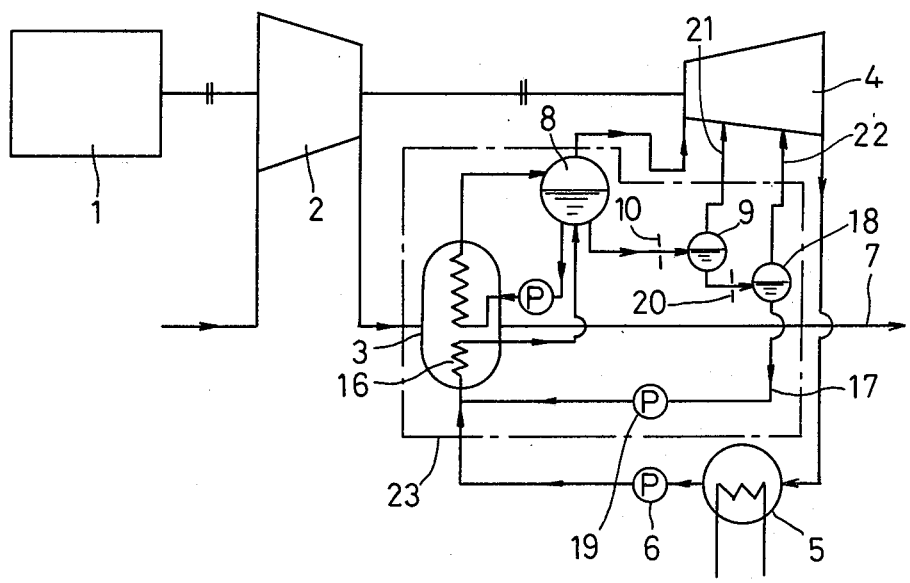

FIG. 6 shows another specific example of this invention. As is evident by comparing this example with the example shown in FIG. 4, in FIG. 6 the refrigerant is stored in both the gas state or phase and in the liquid state which is not included in FIG. 4. In other words, a gas/liquid drum or container 8 is included in the closed circuit in which the refrigerant in FIG. 6 is circulated. In FIG. 6, two refrigerant circuits or loops 12 and 13 are provided, both circuits including the drum 8. The first circuit 12 includes a coil 14 in the exchanger 3, a pump 15 and the drum 8, whereas the second circuit 13 includes another coil 16 in the exchanger 3, the drum 8, the turbine 4, a condenser 5 and the pump 6. The lower part of the drum 8 is filled with liquid refrigerant and the upper part is filled with gaseous refrigerant. The outlets of both coils 14 and 16 are connected to deliver the heated refrigerant to the drum 8, and the intake of the turbine 4 is connected to the upper part of the drum 8 so as to receive the refrigerant in the gaseous state. In this example, the heat transfer between the gas compressed by the compressor and the refrigerant can be performed more effectively than the example shown in FIG. 4. In FIG. 6, it is possible not only to select the piping route to permit effective heat transfer to the refrigerant when the temperature of the compressed gas is decreased from T2 to T3, but there also is provided a stabilized operation throughout the entire system, because the load fluctuations (producing a fluctuation of the temperature T2) do not directly influence the operation of the turbine 4. The specific example shown in FIG. 7 is arranged such that the liquefied refrigerant accumulated in the gas/liquid drum 8 is supplied to the different input stages of a multi-stage turbine 4. Since the refrigerant pressure at the turbine stages is during its expansion process, it is lower than the pressure in the cylinder drum 8. The refrigerant supplied to the different stage is easily expanded in succession toward the outlet of the turbine, resulting in that the turbine power output is increased. When the system is constructed as shown in FIG. 7, it should not be necessary to say that the appropriate refrigerant must be chosen.

The FIG. 7 system includes the components of FIG. 6 except that the turbine in FIG. 7 has multiple input stages, and it also includes another refrigerant circuit 17. The circuit 17 includes the coil 16, the drum 8, two small drums 9 and 18, and a pump 19. Flow control throttles 10 and 20 are respectively connected between the drums 8 and 9 and between the drums 9 and 18. The drum 8 is connected to supply refrigerant to the drum 9 and the drum 9 supplies refrigerant to the drum 18. The two small drums have gas outlets connected to intermediate inputs 21 and 22 of the turbine 4. The drum 18 also has an output connected to the pump 19 and to the coil 16. If only one intermediate or middle input stage 21 is on the turbine 4, only the drum 9 need be provided, and both drums 9 and 18 are provided when multiple middle inputs are included.

When the refrigerant is to be supplied to only the middle stage 21 of turbine, the small drum 9 is attached, and the refrigerant is lead to it from the gas/liquid drum 8 through suitable piping. If the proper flow throttle 10 is equipped in the piping to control the pressure, the refrigerant is boiled in the said drum 9 due to decreased pressure, whereby the refrigerant is easily gasified before entering the middle stage of the turbine 4. If the turbine includes the two middle inputs 21 and 22, both of the small barrels 9 and 18 are provided. Several specific examples have been described so far. It will be apparent that a variety of other examples can be realized by combining the examples. As shown in FIGS. 4 through 7, a common feature of this invention is that the heat transfer is performed between the compressed gas and the refrigerant without the two being mixed, and that the refrigerant is circulated within a closed circuit.

Another feature is that the heat transfer between the compressed gas and the refrigerant is performed so as to evaporate the refrigerant either partially or totally. If the portions of the system closed in the boxes 23 formed by the dash-dot lines in FIGS. 4 through 7 can be regarded as one heat exchange system in each figure, the refrigerant passing through the turbine 4 and the condenser 5 is circulating in one closed circuit. However, the fact remains that the refrigerant receives the heat from the gas compressed by the compressor.

Figure 8:
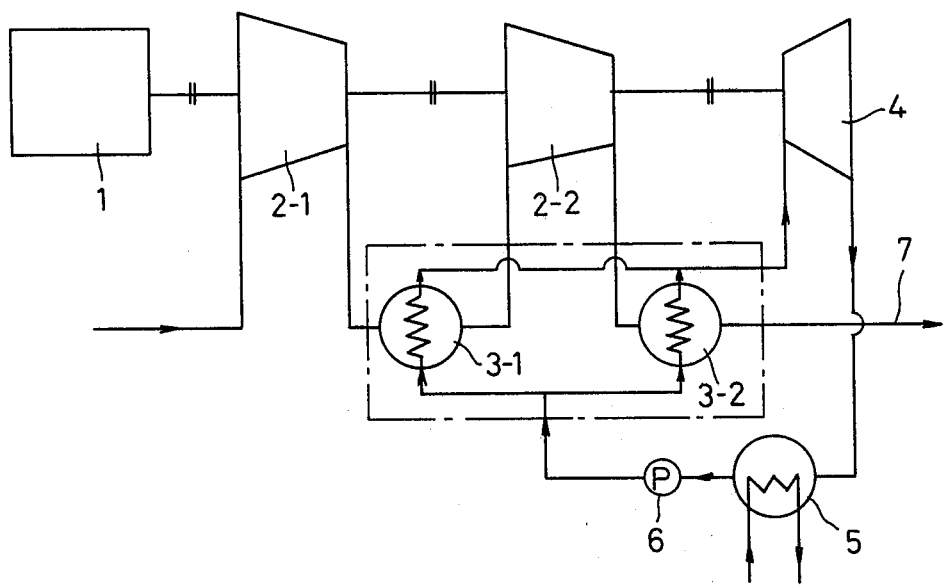

The specific example shown in FIG. 8 is a case wherein the gas compressor is separated into a low-pressure compressor stage 2-1 and a high-pressure compressor stage 2-2. The shafts of the two stages 2-1 and 2-2 are coupled together and to the main drive 1 and the recovery turbine 4. This specific example is provided with a first heat exchanger 3-1 which transfers a heat quantity from the gas compressed by the low-pressure compressor 2-1 (the exchanger 3-1 corresponds to an intercooler from the viewpoint of the gas compressor), and with a second heat exchanger 3-2 which transfers a heat quantity from the gas compressed by the high-pressure compressor 3-2 (the exchanger 3-2 corresponds to an after-cooler).

The refrigerant is moved by the pump 6 through the two exchangers 3-1 and 3-2 which are connected in parallel between the pump and the turbine 4.

Figure 9:
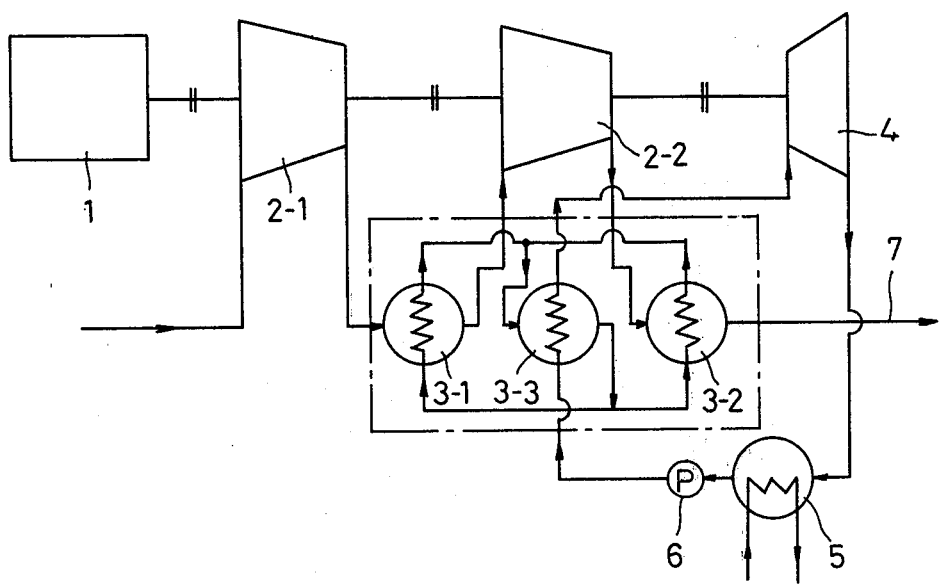
Figure 10:
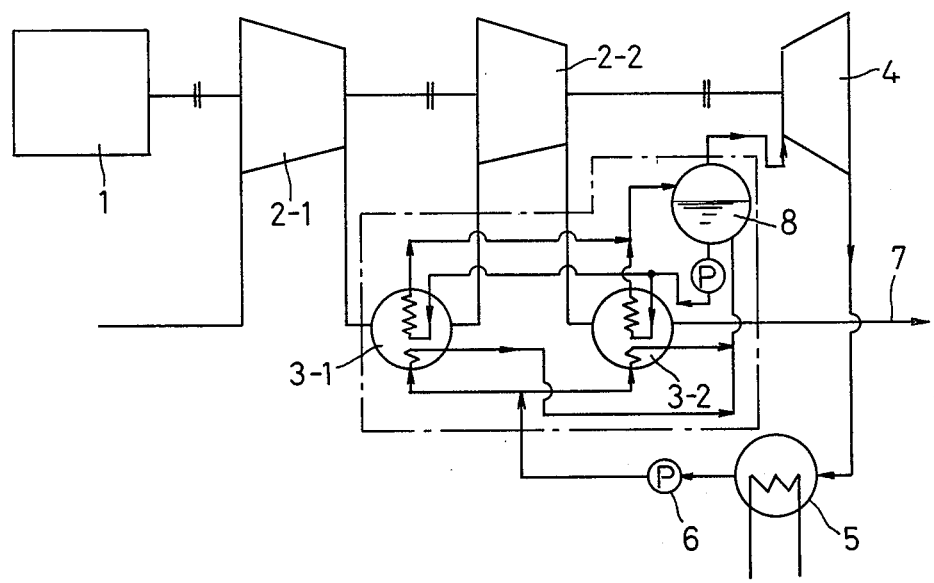

This arrangement corresponds to an extended version of the system of FIG. 4. Also, the specific example shown in FIG. 9 corresponds to an extended version of the system of FIG. 8. With reference to FIG. 9 which also shows a multiple stage gas compressor, the pump 6 moves the refrigerant through a single exchanger 3-3. The heated, compressed gas is passed through two exchangers 3-1 and 3-2. The latter exchangers 3-1 and 3-2 are connected in parallel from the view of the refrigerant, and they both feed refrigerant to the exchanger 3-3. Thus there are two separate refrigerant circuits. Another possible specific example, shown in FIG. 10, a cylinder or drum 8 as shown in FIG. 6 is combined with an intercooler 3-1 and after-cooler 3-2 connected as shown in FIG. 8 and FIG. 9. Similarly, in still another specific example of this invention a small drum 9 as shown in FIG. 7, is provided to supply the gaseous refrigerant to a middle input stage of the turbine 4, in a system as shown in FIG. 10.

Figure 11:
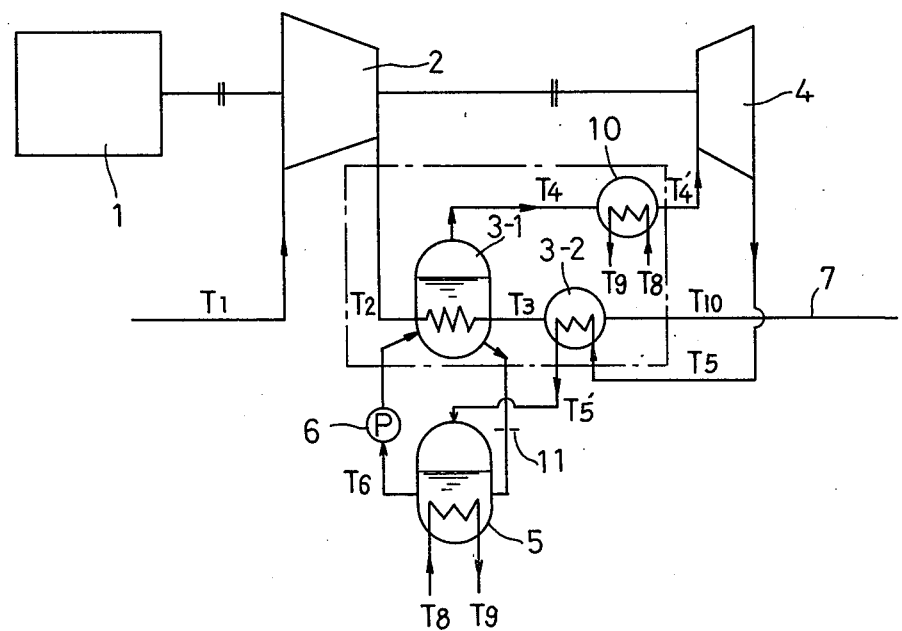

The next specific example of this invention is shown in FIG. 11, wherein a heat quantity of the compressed gas is transferred to a first refrigerant e.g., water ($H_2O$) in a heat exchanger 3-1. The first refrigerant supplied with the heat quantity operates to vaporize a second refrigerant e.g., ammonia ($NH_3$) that is dissolved in the first refrigerant. The temperature of the gaseous or vaporous second refrigerant may be decreased by cooling water supplied from outside in a heat exchanger 10. Then, the gaseous second refrigerant is supplied to the turbine 4, where it is expanded. Thereby, not only does the turbine provide mechanical output, but also the temperature of the second refrigerant is lowered substantially due to expansion in the turbine. The second refrigerant leaves the turbine and is connected to an exchanger 3-2 to further cool the compressed gas fed from the heat exchanger 3-1 down to the temperature T10. The second refrigerant leaving the heat exchanger 3-2 is fed to the condenser 5. The condenser 5 is so designed that after the second refrigerant is vaporaized or evaporated in the heat exchanger 3-1, the first refrigerant with a weak solution of the second refrigerant is led to the condenser 5. The condenser 5 is cooled by the external cooling water. The first refrigerant, the temperature of which is decreased in the condenser 5, can easily absorb the gasified second refrigerant leaving the second heat exchanger 3-2. (It is advisable to choose a second refrigerant which has greatly different dissolving performances in the first refrigerant.) Therefore, the said second refrigerant is absorbed by the first refrigerant in the condenser 5, and is held in such condition where it is dissolved in the first refrigerant, or in solution in the first refrigerant. In other words, the condenser 5 operates to transform the vaporized second refrigerant into the liquid phase in the first refrigerant. The first refrigerant containing the dissolved second refrigerant at a higher concentration, is returned to the other heat exchanger 3-1 by the pump 6. In this manner, the second refrigerant repeats the vaporization and absorption processes as it circulates in the closed circuit, including the exchanger 3-1, the turbine 4, and the condenser 5. This powers the turbine 4, thereby retrieving or collecting a heat quantity of the gas compressed by the compressor 2. In the specific example shown in FIG. 11, it is possible not only to vary the degree of dissolution of the first refrigerant in accordance with the temperature, but also to select a liquefaction temperature far lower than that of external cooling water according to the condition at the outlet of the turbine 4. For this reason, it is possible to decrease the gas temperature (T10) to a value lower than the temperature (T8) of the external cooling water. In this case, as a matter of fact, the volume of external cooling water fed to the condenser 5 and to the cooler 10 at the inlet of the turbine, is larger than that required in the specific example shown in FIG. 4.

Figure 2:
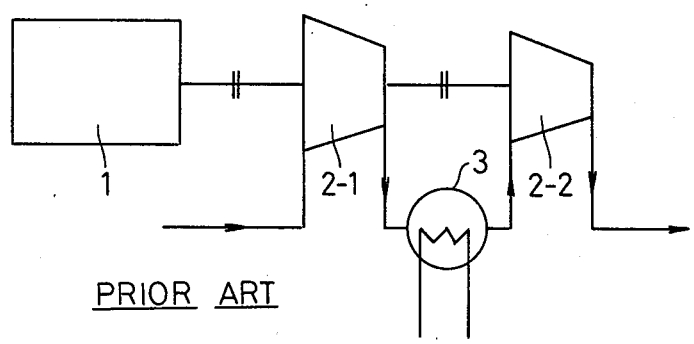

The principle of the example shown in FIG. 11 is especially effective when applied to a facility of the character shown in FIG. 2. In other words, suppose that the delivery pipe 7 shown in FIG. 11 is followed by a high-pressure second stage compressor as shown in FIG. 2, the temperature T10 can be decreased to a value lower than the temperature T8 of the external cooling water, and this means that the driving force required for the high-pressure compressor will be lower than that required for the system shown in FIG. 2. (The driving force required by a compressor is proportional to the absolute temperature of the gas to be compressed, at the inlet of the compressor. This is the basis for the installation of an intercooler in a multi stage compressor.)

As clearly described above, if the principle of the invention shown in FIG. 11 is applied to a system having an intercooler as shown in FIG. 2, it is possible not only to collect or retrieve the power in turbine 4, but also to decrease the driving force required for high-pressure compressor stage, with the result that the capacity of the main drive 1 may be greatly reduced. The heat exchanger 10 shown in FIG. 11 is provided to decrease the outlet temperature (T5) of the turbine by decreasing the inlet temperature (T4) of the gas entering the turbine. In other words, the exchanger 10 is provided to decrease the temperature (T10) of gas in the delivery pipe 7. If it is not necessary that the temperature (T10) be lowered further, the cooler 10 may be eliminated, and the heat exchanger 3-2 also may not be required. It is desirable to install a flow control throttle 11 in the piping carrying the first refrigerant from the heat exchanger 3-1 to the condenser 5 as shown in FIG. 11 so as to control the pressure level.

It should be obvious that the principle of the example shown in FIG. 11, wherein the refrigerant used is a mixture of first and second refrigerants, can be also applied to the examples of this invention shown in FIGS. 9 and 10. In either case, the system can be constructed by combining the piping circuit so that a quantity of the heat of the gas compressed by compressor is transferred to the refrigerant.

The following is an explanation of detailed examples showing how the mechanical output of the energy retrieved or collection turbine is utilized. FIGS. 4 through 11 show examples wherein a main drive 1, a compressor or compressors and a turbine 4 are direct-coupled mechanically. In other words, the foregoing are examples in which the mechanical output (the mechanical rotating force) is connected directly to the rotating shaft of the gas compressor. In such a case, the system need not be arranged in the order of a driving unit 1, a compressor 2, and a turbine 4, as shown in FIG. 12(a). It is also possible to arrange the system in the order of a turbine 4, a driving unit 1, and a compressor 2, as shown in FIG. 12(b). FIGS. 12(c) and 12(d) show different arrangements of a multiple stage gas compressor. In FIG. 12, the heat exchanger, the condenser and the closed refrigerant circuit are omitted in order to simplify the drawings but, of course, they would be provided in accordance with one of the previously described examples of the invention. It is also possible to install a gear coupling such as a step-up or step-down gear connection between the driving unit 1, the compressor and the turbine 4 as necessary to meet specific requirements. If an engagement disengagement type (for instance a clutch type) coupling is provided in between components, for instance, and if the system is so designed that the turbine 4 can be separated from the other components, the maintenance and inspection of the system can be performed with ease.

In addition, if a bypass pipe (not shown) is provided in the examples of this invention shown in FIGS. 4 through 11 around the turbine 4 so that the refrigerant fed to the turbine 4 can be bypassed around the turbine when desired, the compressor can be operated when the turbine 4 is separated. In this case, even if the turbine 4 is ineffective for some reason or other, the plant can still be supplied with the compressed gas at the specified reduced temperature, which ensures a safer system.

The following is a description of a specific example in which the turbine 4 is not directly connected to the compressor or to the main driving unit 1. The refrigerant system shown in FIG. 13 is similar to that shown in FIG. 4. As shown in FIG. 13, the recovery turbine 4 corresponding to the turbine 4 in FIG 4, is coupled with another driven unit 24 such as a generator or a pump, and they are not mechanically connected to the main drive 1 and the gas compressor 2. In this case, the capacity of the driving unit 1 of the compressor 2 is not different from that for a conventional compressor, but the power to drive the driven unit 24 is provided by the recovered energy in accordance with this invention, and the amount of the power collection is significant. For instance, the driven unit 24 described above can be an electrical generator that supplies power to a chemical plant where the compressor equipment is installed. This example not only brings about as a direct result a saving in the energy required by the plant, but it also enables one to collect or retrieve power in an amount that is proportional to the amount of power consumed by the compressor 2, thus stabilizing the energy consumption within the plant.

FIG. 14 shows a structural arrangement for the example shown in FIG. 4. FIG. 14 shows in side view a driving unit 1, a compressor 2 and a turbine 4 installed on a structural foundation shown by diagonal lines. In this example, the heat transfer is performed from the compressed gas to the refrigerant, and therefore, the heat exchanger 3 can be located directly under or very close to the outlet of compressor 2. Since the turbine 4 can be direct-coupled to the compressor 2 shaft as stated above, it is also possible to obtain a very compact arrangement. This permits one to obtain an effective power collection without any restrictions or ill effects upon the arrangement of compressor 2, which is one essential function of this invention. Although the pipping, the pump 6, etc. are shown in simplified form in FIG. 14, this example is characterized in that the heat exchanger 3 is located right under (or closely beside) the compressor 2, and the condenser 5 is located right under (or closely beside) the turbine 4. This compact installation enables one to minimize the pressure loss of the compressed gas and the refrigerant. At the same time, the system of FIG. 14 is arranged on the assumption that the compressor 2 is a so-called axial flow compressor, and that the turbine 4 is also an axial flow type turbine. The driving unit 1 is assumed to be an electric motor. In such an application, it is very easy to direct-couple the driving unit 1, the compressor 2 and the turbine 4. This application enables one to design a layout that does not include a step-up or step-down speed gearing, thus providing an effective arrangement. (The mechanical loss is further reduced as compared with the case where a change-speed gearing is provided. Besides, the shafts of the system will never cause vibration, etc.) FIG. 14 shows structural arrangement illustrating that such equipment can be arranged in a compact manner. The example further proves that this invention is not accompanied by harmful effects in its construction.

FIG. 15 shows an example of a conventional multiplestage compressor system which is divided into (n) number of intercoolers, (n+1) number of gas compressors, and an aftercooler provided at the outlet of the last compressor stage. The graph of FIG. 16 shows an example of the power required of the driving unit, indicated by the solid line (a) when (n) number of intercoolers and one after-cooler are installed in a conventional system as shown in FIG. 15. FIG. 8 shows a specific example in which one intercooler and one after-cooler are provided. An example of the power requirements for the driving unit is shown in FIG. 16 by broken lines (b). Comparing the line (a) for a conventional system with the line (b) for a system using this invention, it will be apparent that there are considerable savings by utilizing this invention. Although the curves shown in FIG. 16 may vary slightly according to the conditions applied to the compressor, it is customary that three intercoolers are enough to minimize the power of the driving unit 1 in a conventional system. In the specific examples using this invention, on the other hand, it is the customary case that the driving unit power output can be minimized effectively using one intercooler. If the number of intercoolers is increased, with the pressure in the entire compressor system held at a constant level, it suddenly becomes difficult to collect the power according to this invention, because the temperature level of the compressed gas is decreased at the outlet of each compressor. For this reason, the installation of one intercooler is optimum when the specific example of this invention is applied as shown in FIG. 16. In other words, the casing of a conventional type of compressor was divided into four portions or so to permit the insertion of three intercooler units, which was optimum from the viewpoint of power needed for driving unit. However, the driving unit power can be further reduced by dividing the compressor casing into two portions to equip a turbine, etc. with one intercooler inserted. Thus, the reduced number of divided portions of compressor contributes not only to a reduction in the driving power, but also to a simplified construction of compressor, thus providing easy maintenance and inspection, and further improving the reliability of the compressor. Especially when the compressor being used is an axial flow type compressor, this provides an essential factor enabling a reduction in the number of the divided portions of compressor. In other words, although a compressor of the axial flow type is constructed substantially long in axial direction, it becomes extremely long in the axial direction as the portions occupied by the infusers or diffusers are increased when the compressor is divided into many casing portions. On the other hand, this invention permits one to use only two casings without fear of causing vibration, etc. in the shaft system, and it is very desirable in many applications.

FIG. 17 is a sectional drawing of an example for an axial flow type compressor constructed with two casings. In FIG. 17, only the major components are covered in order to simplify the description, and the heat exchanger and the turbine are omitted. The low-pressure compressor 2-1 and the high-pressure compressor 2-2 are provided with an inducer (i) and a diffuser (d) respectively. In such an example where the system is constructed including a driving unit 1 and an axial flow type compressor 2-1 and 2-2, the number of intercooler 3-1 required to be installed is limited. Thus, this invention requiring at most one intercooler unit 3-1 is more effective in such an application example as stated above.

Figure 3:
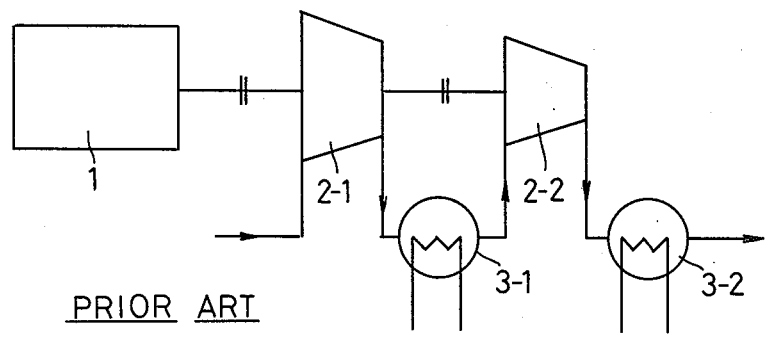

In the following, the validity and importance of this invention is to be described from another point of view. In the compressor constructed as shown in FIG. 3, for instance, the inlet gas temperature of the high-pressure compressor stage was reduced by the intercooler 3-1 in order to reduce the driving unit power requirement in the conventional system. This illustration includes the case where the gas compressed by the compressor is ordinary air. In such a case, the moisture content of the compressed air was usually partly condensed when the air is cooled in the intercooler. A part of the condensation, or small liquid droplets, was usually fed to the high-pressure compressor together with the compressed gas, resulting in so-called condensation attack at the impeller of the high-pressure compressor.

In the specific example of this invention shown in FIG. 8, however, the compressed gas supplied from the heat exchanger 3-1, corresponding to an intercooler is cooled to such a temperature level at which no condensation is caused before it is supplied to the high-pressure compressor. Although the power of the high-pressure compressor is slightly increased in this case, the quantity of heat collected from the heat exchanger corresponding to an after-cooler is increased due to increased humidity of the compressed gas at the outlet of the high-pressure compressor, thus resulting in increased amount of power to be collected or retrieved by the turbine 4. This permits a reduction in the driving unit power in the entire compressor system to a value far lower than that in the conventional system shown in FIG. 3. It also makes it possible to select a temperature level which does not allow the generation of condensation at the inlet of the high-pressure compressor, resulting in the elimination of condensation attack in the high-pressure compressor.

If a compressor systems handling a gas component such as hydrogen sulfide (H2S) which may promote corrosion properties due to the presence of condensation, it can be said that this invention fulfills an essential action.

As explained concretely in the above specific examples, the systems is so constructed that the turbine is operated by the power resulting from the circulating refrigerant, with a quantity of the heat of the gas compressed by the compressor as a heat source. Therefore, it has become possible to collect the waste heat which previously was disposed as waste heat in the conventional systems. In addition, the invention makes it possible to effectively utilize the energy collected, as a mechanical output, which makes it possible to greatly reduce the amount of power required for the main driving unit, or to apply the power directly to the equipment requiring such power. It is also possible to decrease the quantity of the cooling water to be cooled from outside, by a quantity corresponding to the power collected. It may be also possible to cool the gas compressed to a value lower than the temperature of the outside cooling water. It is easy to maintain the temperature of the compressed gas at the temperature required for the plant utilizing the gas. It is also an important effect of this invention that the power collected is increased in proportion to the load applied to the compressor, which helps to stabilize the operation of the entire system. As stated above, this invention also enables the elimination of condensation attack, which accompanies the essential effects as described in the foregoing.

What is claimed is:

1. In a gas compression plant including a gas compressor driven by a main drive, the compressor including a gas intake and a compressed gas outlet, the improvement comprising a refrigerant circuit connected to said gas outlet, said refrigerant system including a heat exchanger connected to receive said compressed gas, a turbine, a condenser, and a pump for circulating said refrigerant through said circuit, said refrigerant being heated and vaporized in said heat exchanger by a quantity of heat received from said compressed gas, and said vaporized refrigerant expanding in and driving said turbine and being liquefied in said condenser.

2. Apparatus as in claim 1, wherein the power output of said turbine is connected to drive said gas compressor.

3. Apparatus as in claim 1 or 2, wherein the gas compressor is a multiple stage compressor, and said refrigerant circuit includes a heat exchanger between adjacent stages of said compressor.

4. Apparatus as in claim 3, wherein said refrigerant system further includes an after-cooler connected to the last of said multiple stages.

5. Apparatus as in claim 1, wherein said turbine is coupled to drive a device which is separate from said compressor.

6. Apparatus as in claim 1 or 2, wherein said refrigerant circuit further includes a barrel and said circuit is divided into first and second refrigerant paths, said first path including said heat exchanger, said barrel, said turbine, said pump and said condenser, and said second path including said heat exchanger and said barrel, said first and second paths merging in said barrel.

7. Apparatus as in claim 6, wherein said turbine has multiple input stages, and said refrigerant circuit further includes a second barrel connected to said first-mentioned barrel, to an intermediate input of said turbine, and to said heat exchanger.

8. Apparatus as in claim 3, wherein said refrigerant flows in parallel in said heat exchangers.

9. Apparatus as in claim 1 or 2, wherein said refrigerant circuit includes first and second paths and first and second refrigerants flowing in said paths, one of said refrigerants being dissolved in the other of said refrigerants, said first path including said heat exchanger, said turbine and said condenser, and said second path including said heat exchanger and said condenser, both of said refrigerants circulating in said heat exchanger and in said condenser, and one of said refrigerants being dissolved in the other of said refrigerants.

* * * * *